United States Patent
Tanaka et al.

(10) Patent No.: US 12,468,210 B2
(45) Date of Patent: Nov. 11, 2025

(54) OPTICAL UNIT

(71) Applicant: Nidec Corporation, Kyoto (JP)

(72) Inventors: Shogo Tanaka, Kyoto (JP); Keishi Otsubo, Kyoto (JP); Tomohiro Egawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 426 days.

(21) Appl. No.: 18/013,666

(22) PCT Filed: Dec. 22, 2020

(86) PCT No.: PCT/JP2020/047974
§ 371 (c)(1),
(2) Date: Dec. 29, 2022

(87) PCT Pub. No.: WO2022/004009
PCT Pub. Date: Jan. 6, 2022

(65) Prior Publication Data
US 2023/0359103 A1  Nov. 9, 2023

(30) Foreign Application Priority Data
Jun. 30, 2020  (JP) .................. 2020-112921

(51) Int. Cl.
*G03B 5/06* (2021.01)
*G02B 27/64* (2006.01)
*H04N 23/68* (2023.01)

(52) U.S. Cl.
CPC ............ *G03B 5/06* (2013.01); *G02B 27/646* (2013.01); *H04N 23/685* (2023.01); *G03B 2205/0023* (2013.01)

(58) Field of Classification Search
None
See application file for complete search history.

(56) References Cited

U.S. PATENT DOCUMENTS

| | | | |
|---|---|---|---|
| 8,649,672 B2 | 2/2014 | Takizawa | |
| 8,780,264 B2 | 7/2014 | Inata et al. | |
| 9,225,899 B2 | 12/2015 | Takizawa | |
| 10,747,013 B2 | 8/2020 | Lim | |
| 2008/0074504 A1* | 3/2008 | Sekino | H04N 23/68 348/208.99 |
| 2020/0326497 A1 | 10/2020 | Fujisaki et al. | |

FOREIGN PATENT DOCUMENTS

| | | |
|---|---|---|
| JP | 2008-233780 A | 10/2008 |
| JP | 2017-198727 A | 11/2017 |
| JP | 2019-020525 A | 2/2019 |

OTHER PUBLICATIONS

Official Communication issued in International Patent Application No. PCT/JP2020/047974, mailed on Mar. 30, 2021.

* cited by examiner

*Primary Examiner* — Derek S. Chapel
(74) *Attorney, Agent, or Firm* — Keating & Bennett, LLP

(57) ABSTRACT

An optical assembly includes a fixed body and a movable body supported swingably with respect to the fixed body, and the movable body includes an optical element including an optical axis, a holder into which the optical element is insertable, a contact portion in the holder and in contact with the fixed body, and an elastic body to press the contact portion toward the fixed body.

18 Claims, 11 Drawing Sheets

OPTICAL UNIT

CROSS-REFERENCE TO RELATED APPLICATIONS

This is a U.S. national stage of application No. PCT/JP2020/047974, filed on Dec. 22, 2020, and with priority under 35 U.S.C. § 119 (a) and 35 U.S.C. § 365 (b) being claimed from Japanese Patent Application No. 2020-112921, filed on Jun. 30, 2020, the entire disclosures of which are hereby incorporated herein by reference.

1. FIELD OF THE INVENTION

The present disclosure relates to an optical assembly.

2. BACKGROUND

Sometimes an image blur is generated due to camera shake during capturing a still image or a moving image with a camera. For this reason, an image stabilization device has been put into practical use to enable clear imaging with image blur prevention. When the camera shakes, the image stabilization device can remove the image blur by correcting a position and orientation of a camera module according to the shake.

Conventionally, in an image stabilization device, when a lens of a camera module moves unstably, camera shake cannot be sufficiently corrected. For this reason, it has been studied to stabilize the movement of a lens support. A conventional lens drive device adjusts pressure between a movable body and a fixed portion by pressing a ball member in contact with each of the movable body and the fixed portion by an elastic body (leaf spring) disposed between the movable body and the fixed portion.

However, in the conventional lens drive device, the elastic body presses, from the side, the ball member located between the movable body and the fixed portion, and therefore the position of the movable body is sometimes deviated with respect to the fixed portion, and the movable body is sometimes not appropriately movable with respect to the fixed portion.

SUMMARY

An optical assembly according to an example embodiment of the present disclosure includes a fixed body and a movable body supported to be swingable with respect to the fixed body. The movable body includes an optical element having an optical axis, a holder into which the optical element can be inserted, a contact portion located in the holder and in contact with the fixed body, and an elastic body that presses the contact portion toward the fixed body.

The above and other elements, features, steps, characteristics and advantages of the present disclosure will become more apparent from the following detailed description of the example embodiments with reference to the attached drawings.

DETAILED DESCRIPTION

Figure 1:
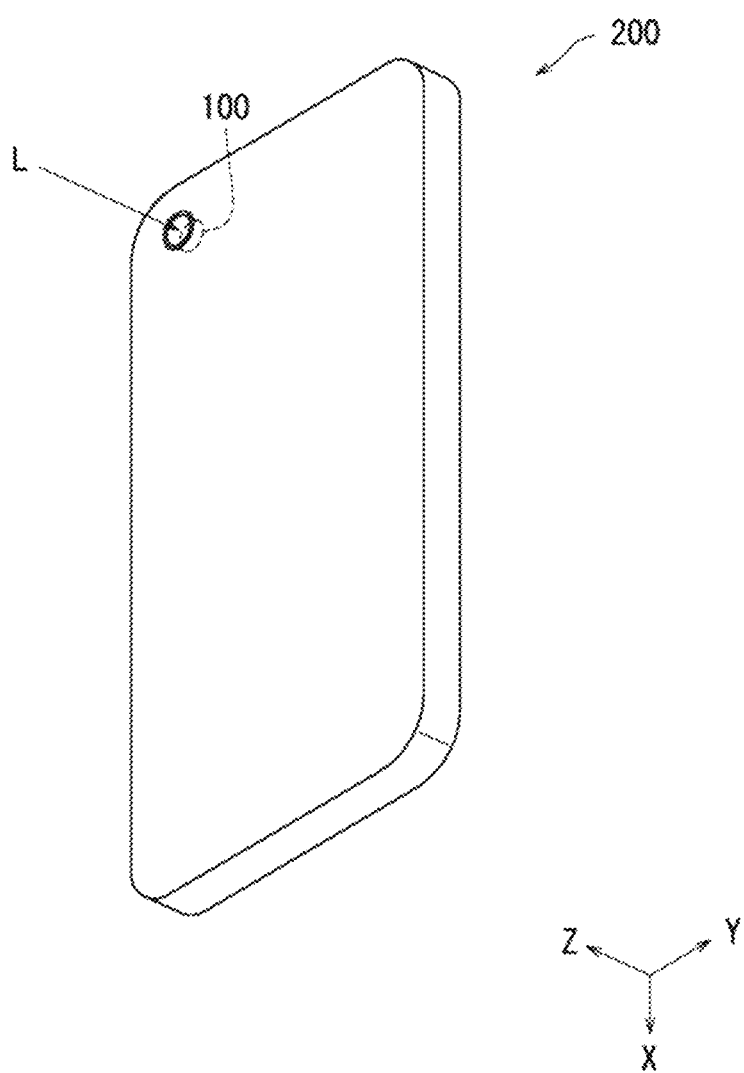
FIG. 1 is a schematic perspective view of a smartphone including an optical assembly of an example embodiment of the present disclosure.

Exemplary optical assemblies according to example embodiments of the present disclosure will be described below with reference to the drawings. Note that in the drawings, the same or corresponding elements or features will be denoted by the same reference symbols and description of such elements or features will not be repeated. Note that in the description of the present application, an X axis, a Y axis, and a Z axis that are orthogonal to one another may be used to facilitate understanding of the disclosure. Here, it should be noted that the X axis, the Y axis, and the Z axis do not limit the orientation of the optical assembly during use.

An optical assembly 100 is suitably used as an optical component of a smartphone.

First, a smartphone 200 including the optical assembly 100 of the present example embodiment will be described with reference to FIG. 1. FIG. 1 is a schematic perspective view of the smartphone 200 including the optical assembly 100 of the present example embodiment.

As shown in FIG. 1, the optical assembly 100 is mounted in the smartphone 200 as an example. Light L enters the smartphone 200 from an outside through the optical assembly 100, and a subject image is captured based on the light that enters the optical assembly 100. The optical assembly 100 is used to correct blur of the captured image when the smartphone 200 shakes. The optical assembly 100 may include an imaging element, and the optical assembly 100 may include an optical member that transmits the light to the imaging element.

The optical assembly 100 is preferably manufactured in a small size. This allows the smartphone 200 itself to be downsized, or allows another component to be mounted in the smartphone 200 without upsizing the smartphone 200.

The application of the optical assembly 100 is not limited to the smartphone 200, but the optical assembly 100 can be used in various devices such as a camera and a video without particular limitation. For example, the optical assembly 100 may be mounted on, for example, imaging equipment such as a mobile phone with a camera or a dashboard camera, or an action camera and a wearable camera mounted on a moving body such as a helmet, a bicycle, or a radio-controlled helicopter.

Figure 2:
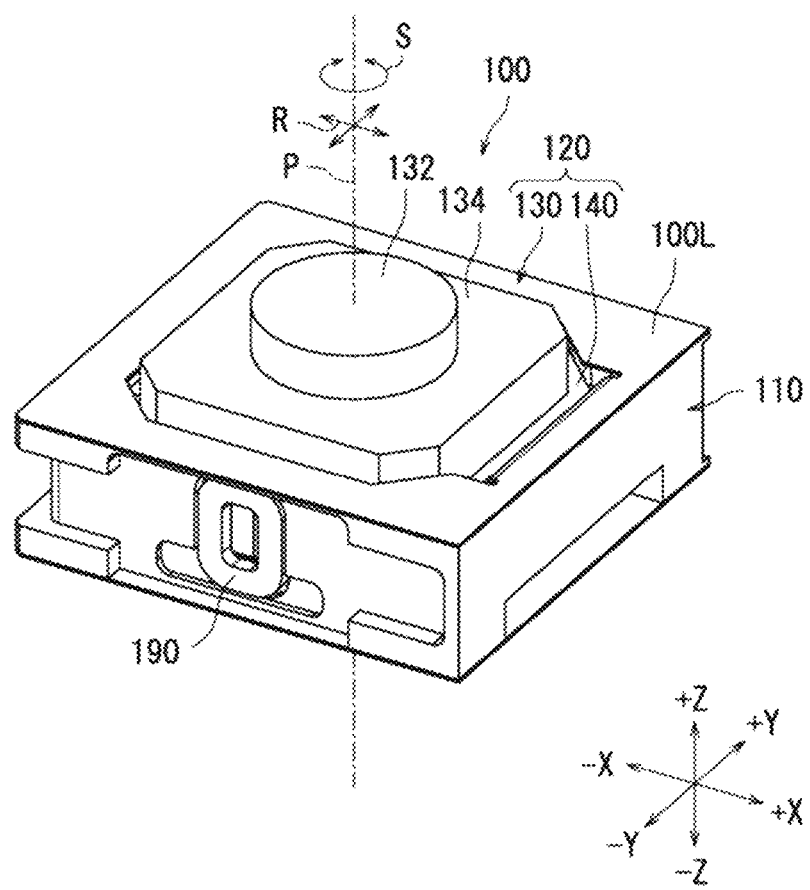
FIG. 2 is a schematic perspective view of the optical assembly of the present example embodiment.

Next, the configuration of the optical assembly 100 of the present example embodiment will be described with reference to FIGS. 2 and 3. FIG. 2 is a schematic perspective view of the optical assembly 100 of the present example embodiment, and FIG. 3 is a schematic exploded perspective view of the optical assembly 100 of the present example embodiment.

Figure 3:
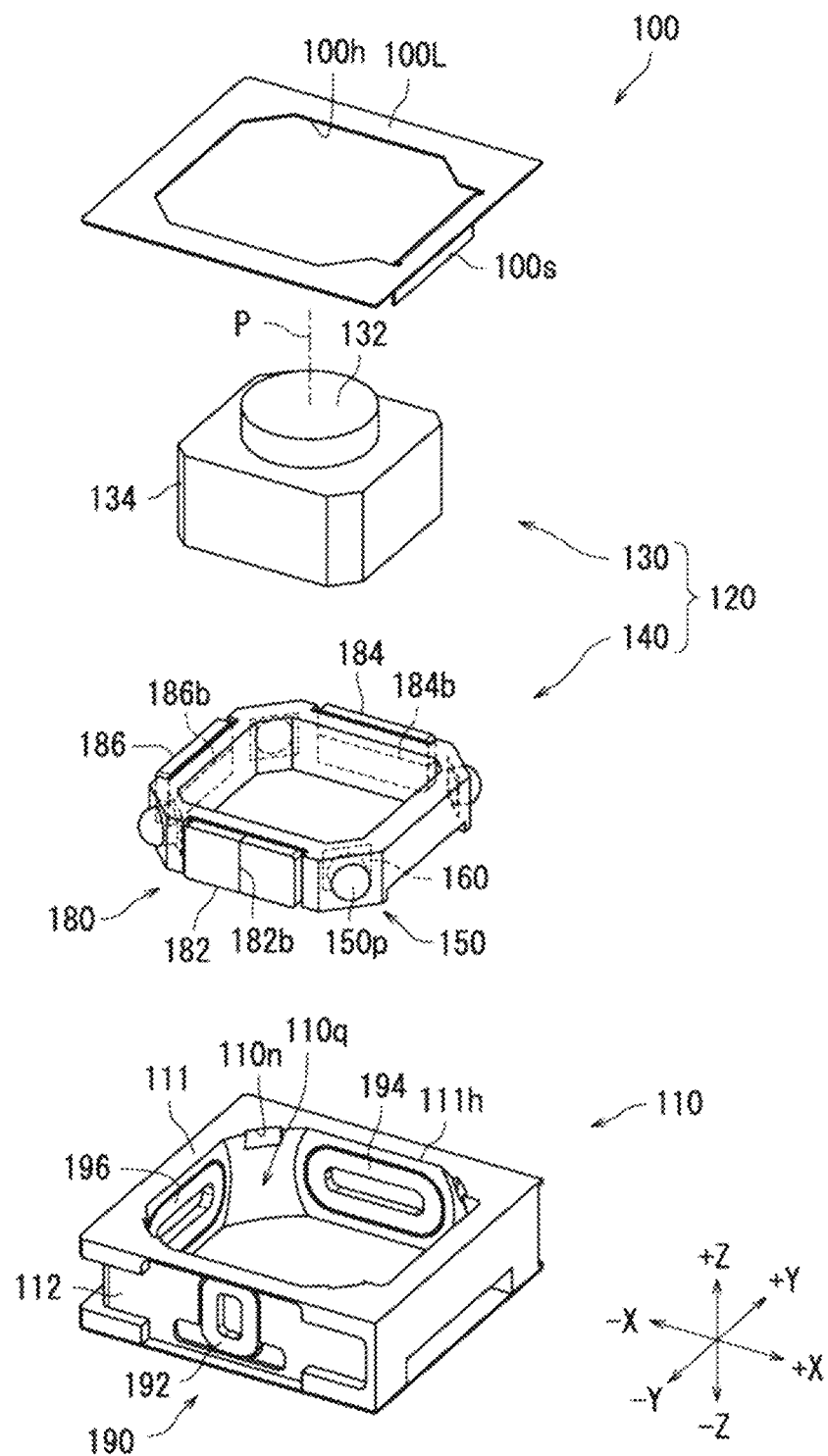
FIG. 3 is a schematic exploded perspective view of the optical assembly of the present example embodiment.

As shown in FIGS. 2 and 3, the optical assembly 100 includes a fixed body 110 and a movable body 120. The movable body 120 is supported swingably with respect to the fixed body 110. The movable body 120 is inserted into the fixed body 110 and held by the fixed body 110.

The optical assembly 100 may further include a lid 100L. The lid 100L covers one side of each of the fixed body 110 and the movable body 120, so that the movable body 120 can be prevented from being removed from the fixed body 110.

As shown in FIG. 3, the movable body 120 includes an optical element 130, a holder 140, a contact portion 150, and an elastic body 160. The optical element 130 has an optical axis P. The optical element 130 can be inserted into the holder 140.

When the movable body 120 is inserted into the fixed body 110 to attach the movable body 120 to the fixed body 110, the optical axis P of the optical element 130 becomes parallel to the Z axis direction. When the movable body 120 swings with respect to the fixed body 110 from this state, the optical axis P of the optical element 130 swings, and therefore the optical axis P is no longer in a state of being parallel to the Z axis direction. In the following description, it is assumed that the movable body 120 does not swing with respect to the fixed body 110 and that the state in which the optical axis P is parallel to the Z axis direction is maintained. That is, in the description of shapes, positional relationships, operations, and the like of the fixed body 110, the movable body 120, the lid 100L, and the like with reference to the optical axis P, it is assumed that the optical axis P is in a state of being parallel to the Z axis direction unless the inclination of the optical axis P is specifically described.

The X axis direction is a direction intersecting with the optical axis P, and is an axis of rotation in a yawing direction. The Y axis direction is a direction intersecting with the optical axis P, and is an axis of rotation in a pitching direction. The Z axis direction is an optical axis direction of the optical element 130, and is an axis of rotation in a rolling direction. The optical axis direction indicates a direction parallel to the extending direction of the optical axis P.

In optical equipment including the optical element 130, when the optical equipment is inclined at the time of imaging, the optical element 130 is inclined, and the captured image is disturbed. In order to avoid disturbance of the captured image, the optical assembly 100 corrects the inclination of the optical element 130 based on acceleration, an angular velocity, a shake amount, and the like detected by a detection means such as a gyroscope. In the present example embodiment, the optical assembly 100 corrects the inclination of the optical element 130 by swinging (rotating) the movable body 120 in a rotation direction (yawing direction) with the X axis as a rotation axis, a rotation direction (pitching direction) with the Y axis as a rotation axis, and a rotation direction (rolling direction) with the Z axis as a rotation axis.

The optical element 130 has the optical axis P. The optical axis P of the optical element 130 is parallel to a normal line of a light incident surface of the optical element 130. The light from the optical axis P enters the optical element 130.

The optical element 130 includes a lens 132 and a housing 134. The optical element 130 may include an imaging element in the housing 134. The optical element 130 including the imaging element is also called a camera module. When the optical element 130 is inserted into the holder 140, the optical element 130 is held by the holder 140.

The holder 140 has an annular shape in which both ends in the Z axis direction are open. The optical element 130 is attached to the inside of the holder 140.

In the optical assembly 100 of the present example embodiment, the contact portion 150 is disposed on the holder 140 and comes into contact with the fixed body 110. The elastic body 160 presses the contact portion 150 toward the fixed body 110. When the elastic body 160 in the movable body 120 presses the contact portion 150 in contact with the fixed body 110, the movable body 120 is supported swingably with respect to the fixed body 110. This allows the movable body 120 to be stably supported with respect to the fixed body 110.

The optical assembly 100 further includes a magnet 180 and a coil 190. The coil 190 opposes the magnet 180. The magnet 180 is provided on one of the fixed body 110 and the movable body 120, and the coil 190 is provided on the other of the fixed body 110 and the movable body 120.

Here, the magnet 180 is provided on the movable body 120, and the coil 190 is provided on the fixed body 110. For example, the magnet 180 is disposed on an outer peripheral surface of the holder 140, and the coil 190 is disposed on a side surface of the fixed body 110. The coil 190 may be disposed in a through hole of the fixed body 110. However, the magnet 180 may be provided on the fixed body 110, and the coil 190 may be provided on the movable body 120.

The optical assembly 100 is preferably manufactured in a small size. For example, when the optical assembly 100 is mounted in the smartphone of FIG. 1, the size (for example, the length of the fixed body 110 along the X axis direction or the Y axis direction) of the optical assembly 100 is equal to or greater than 10 mm and equal to or less than 50 mm.

The fixed body 110 has a substantially tubular shape. The outer shape of the fixed body 110 is a rectangular parallelepiped shape with a through hole having a substantially rectangular section. The fixed body 110 includes, for example, resin. The fixed body 110 includes a frame part 111 and a side part 112. The side part 112 is supported by the frame part 111. An opening 111*h* is formed in the frame part 111.

As shown in FIG. 3, the fixed body 110 has a concave 110*q*. The concave 110*q* is located on the inner peripheral surface of the side part 112. When the movable body 120 is inserted into the fixed body 110, the concave 110q comes into contact with the movable body 120. Typically, when the movable body 120 swings with respect to the fixed body 110, the movable body 120 slides on the concave 110q while being in contact with the concave 110q. The concave 110q preferably has a part of a concave spherical shape.

The concave 110q is disposed at each of four corners of the fixed body 110. The radius of curvature of the four concaves 110q may be equal. In this case, the four concaves 110q may each constitute a part of one large concave spherical surface. Alternatively, the radius of curvature of the four concaves 110q may be different.

The fixed body 110 has a cutout 110n continuous to the concave 110q. The holder 140 in which the contact portion 150 is disposed can be easily inserted into the fixed body 110 by the cutout 110n.

The optical element 130 includes the lens 132 and the housing 134. The housing 134 has a thin rectangular parallelepiped shape. The lens 132 is disposed in the housing 134. For example, the lens 132 is disposed on the optical axis P at the center of one surface of the housing 134. The optical axis P and the lens 132 face the subject, and light from a direction along the optical axis P enters the optical element 130.

An imaging element or the like may be incorporated in the housing 134. In this case, a flexible printed circuit (FPC) is preferably connected to the imaging element. A signal captured by the optical element 130 is extracted to the outside through the FPC.

The holder 140 has a frame shape. The holder 140 surrounds the optical element 130 from the outside. For example, the holder 140 is made of resin.

The holder 140 is a thick plate-shaped frame body extending in a direction orthogonal to the optical axis P. The direction orthogonal to the optical axis P is a direction that intersects with the optical axis P and is perpendicular to the optical axis P. In the present description, a direction intersecting with the optical axis P and orthogonal to the optical axis P may be referred to as "radial direction". A radial outside indicates a direction separating from the optical axis P. In FIG. 2, R indicates an example of the radial direction. Sometimes a direction of rotation about the optical axis P is referred to as "circumferential direction". In FIG. 2, S indicates the circumferential direction. Details of the configuration of the holder 140 will be described later.

The contact portion 150 comes into contact with the fixed body 110. The contact portion 150 protrudes from the holder 140 toward the fixed body 110. At least a part of the contact portion 150 is located on an outer surface of the holder 140. Specifically, at least a part of the contact portion 150 is located on an outer surface of a corner of the holder 140. The contact portion 150 preferably slides with respect to the fixed body 110. In this case, the contact portion 150 preferably has a columnar shape. This allows the movable body to be smoothly moved with respect to the fixed body 110. For example, the contact portion 150 has a hemispherical part.

The contact portion 150 has a protrusion 150p. The protrusion 150p is located radially outside the contact portion 150. The protrusion 150p protrudes radially outward from the holder 140 and comes into contact with the fixed body 110. The protrusion 150p may have a curved shape protruding in a curved manner. For example, the protrusion 150p is curved in a spherical shape.

At least a part of the contact portion 150 is provided as a member different from the holder 140, and is movable with respect to the holder 140. Here, the contact portion 150 is configured as a member separate from the holder 140. However, the present example embodiment is not limited to this. At least a part of the contact portion 150 may include the same member as the holder 140. Details of the configuration of the contact portion 150 will be described later.

The elastic body 160 presses the contact portion 150 toward the fixed body 110. A force is applied to the contact portion 150 by deformation of the elastic body 160. The elastic body 160 is located between the optical element 130 and the contact portion 150. The elastic body 160 is disposed in the holder 140.

The elastic body 160 may be a spring. For example, the elastic body 160 is a leaf spring. The leaf spring may be bent. The leaf spring may include SUS or may include phosphor bronze. Alternatively, the elastic body 160 may be a coil spring. Details of the configuration of the elastic body 160 will be described later.

In the optical assembly 100 of the present example embodiment, the movable body 120 preferably moves smoothly with respect to the fixed body 110. Therefore, it is preferable that the elastic body 160 includes a composition having a small load with respect to the deflection amount.

The magnet 180 generates a magnetic field. Typically, the magnet 180 is a permanent magnet. Here, the magnet 180 includes a first magnet 182, a second magnet 184, and a third magnet 186. The first magnet 182, the second magnet 184, and the third magnet 186 are each attached to the side surface of the holder 140.

The first magnet 182 is located on the −Y direction side with respect to the movable body 120 and extends in the X axis direction. The second magnet 184 is located on the +Y direction side with respect to the movable body 120 and extends in the X axis direction. The third magnet 186 is located on the −X direction side with respect to the movable body 120 and extends in the Y axis direction.

The coil 190 includes a first coil 192, a second coil 194, and a third coil 196. The first coil 192, the second coil 194, and the third coil 196 are each attached to the fixed body 110.

The first coil 192 is located on the −Y direction side with respect to the fixed body 110 and extends in the Z axis direction. The second coil 194 is located on the +Y direction side with respect to the fixed body 110 and extends in the X axis direction. The third coil 196 is located on the −X direction side with respect to the fixed body 110 and extends in the Y axis direction.

In FIG. 3, the first magnet 182 and the first coil 192 generate a driving force for rotating the movable body 120 about the Z axis. Similarly, the second magnet 184 and the second coil 194 generate a driving force for rotating the movable body 120 about the X axis, and the third magnet 186 and the third coil 196 generate a driving force for rotating the movable body 120 about the Y axis.

The first magnet 182 is magnetized such that a magnetic pole of a surface facing radially outward is different at a magnetization polarization line 182b extending in the optical axis direction along the Z axis direction. One end of the first magnet 182 along the X axis direction has one polarity, and the other end has the other polarity.

The second magnet 184 is magnetized such that a magnetic pole of a surface facing radially outward is different at a magnetization polarization line 184b extending in the optical axis direction along the X axis direction. One end of the second magnet 184 along the Z axis direction has one polarity, and the other end has the other polarity. Similarly, the third magnet 186 is magnetized such that a magnetic pole of a surface facing radially outward is different at a magnetization polarization line 186b extending in the optical axis direction along the Y axis direction. One end of the third magnet 186 along the Z axis direction has one polarity, and the other end has the other polarity.

For example, corrections of pitching, yawing, and rolling of the movable body 120 are performed as follows. When shake in at least one direction of the pitching direction, the yawing direction, and the rolling direction occurs in the optical assembly 100, the shake is detected by a magnetic sensor (Hall element) not illustrated, and based on the result, current is supplied to the first coil 192, the second coil 194, and the third coil 196 to drive a shake correction magnetic drive mechanism. Shake of the optical assembly 100 may be detected using a shake detection sensor (gyroscope) or the like. The shake correction magnetic drive mechanism corrects the shake based on the detection result of the shake.

The lid 100L covers the fixed body 110 and the movable body 120. The lid 100L includes, for example, resin. The lid 100L is a plate-like member having a thickness in the Z axis direction. The lid 100L is fixed to the +Z-direction side (one side in the optical axis direction) of the fixed body 110. In the present example embodiment, the lid 100L is fixed to the frame part 111 of the fixed body 110. The configuration for fixing the lid 100L to the fixed body 110 is not particularly limited. The lid 100L may be fixed to the fixed body 110 using, for example, a fastening member such as a screw, or may be fixed to the fixed body 110 using an adhesive.

The lid 100L includes a hole 100h and a rotation stopper 100s. The hole 100h penetrates the lid 100L in the Z axis direction. The hole 100h of the lid 100L opposes the opening 111h of the fixed body 110. The lens 132 of the movable body 120 is exposed to the outside of the fixed body 110 through the opening 111h of the fixed body 110 and the hole 100h of the lid 100L.

As described above with reference to FIG. 3, the contact portion 150 includes the protrusion 150p protruding from the fixed body 110. Since the contact portion 150 of the movable body 120 includes the protrusion 150p, the movable body 120 can be thinned.

The protrusion 150p preferably includes a part of a spherical surface. This allows the movable body 120 to be smoothly moved with respect to the fixed body 110.

The fixed body 110 has the concave 110q in a region in contact with the protrusion 150p of the contact portion 150. The movable body 120 can be smoothly moved with respect to the fixed body 110.

Furthermore, the concave 110q includes a part of a concave spherical shape. The movable body 120 can be smoothly moved with respect to the fixed body 110.

The fixed body 110 has the cutout 110n continuous to the concave 110q. The movable body 120 can be easily attached to the fixed body 110 by the cutout 110n continuous to the concave 110q of the fixed body 110.

Figure 4A:
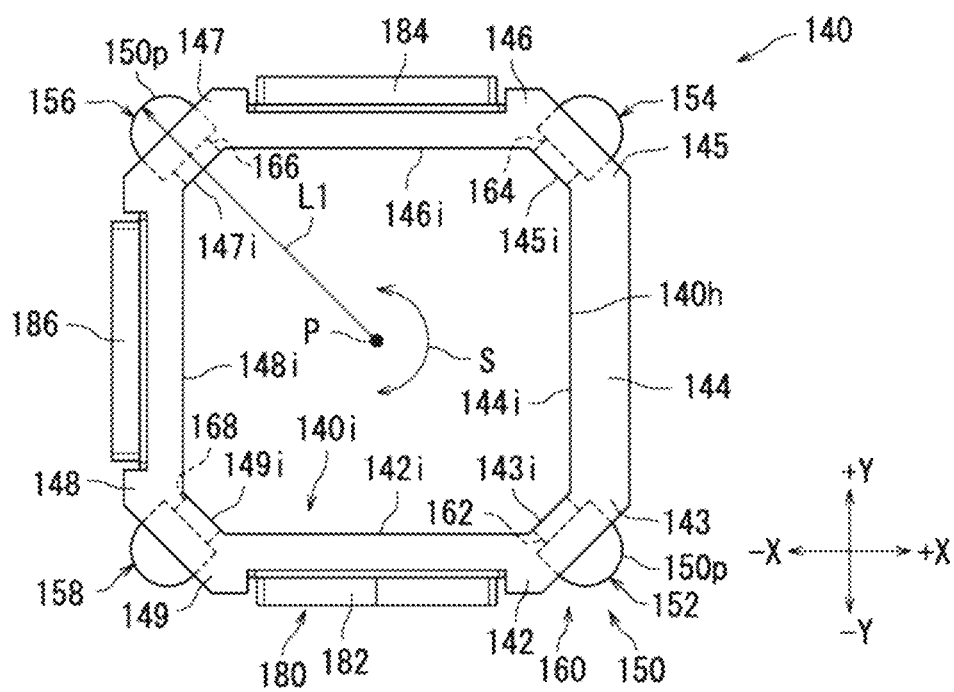
FIG. 4A is a schematic top view of a holder, a contact portion, an elastic body, and a magnet in the optical assembly according to an example embodiment.
Figure 4B:
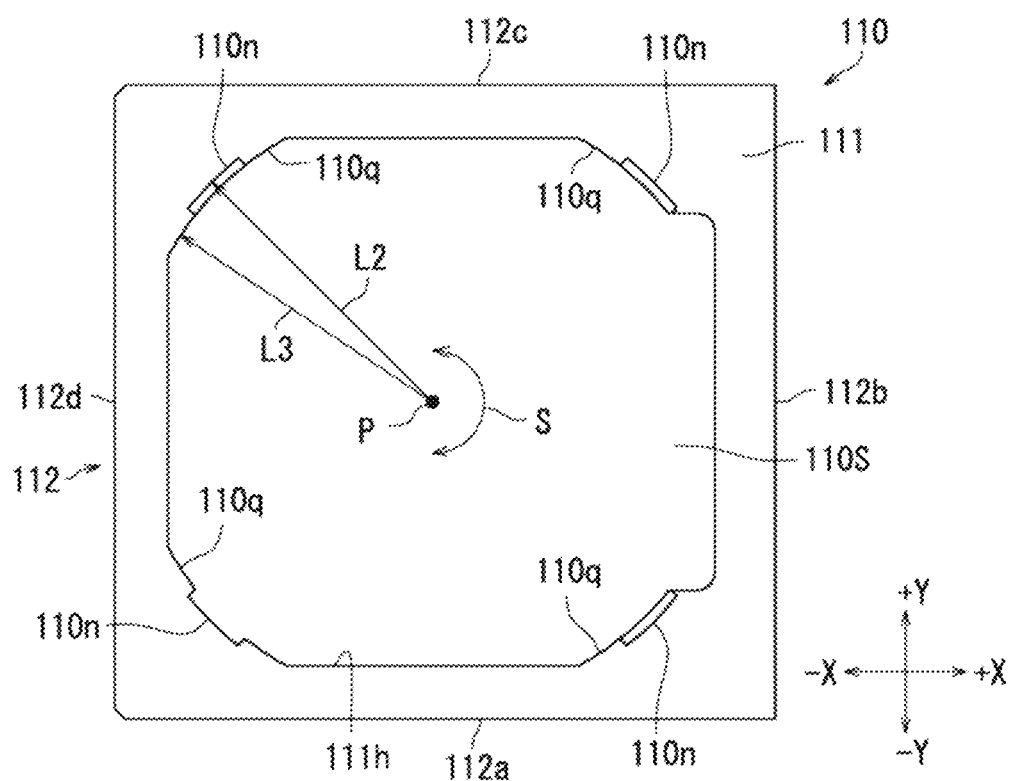
FIG. 4B is a schematic top view of a fixed body in the optical assembly of the present example embodiment.

Next, the optical assembly 100 will be described in more detail with reference to FIGS. 2 to 4B. FIG. 4A is a schematic top view of the holder 140, the contact portion 150, the elastic body 160, and the magnet 180, and FIG. 4B is a schematic top view of the fixed body 110.

As described above, the holder 140 has a tubular shape and includes a through hole 140h. Although not illustrated in FIG. 4A, the optical element 130 (FIGS. 2 and 3) is inserted into the through hole 140h of the holder 140. FIG. 4A shows the optical axis P at a position of the optical axis P when the optical element 130 is inserted into the holder 140.

The holder 140 has a plurality of side parts and a connection part connecting adjacent side parts. Specifically, the holder 140 includes a first side part 142, a second side part 144, a third side part 146, a fourth side part 148, a first connection part 143, a second connection part 145, a third connection part 147, and a fourth connection part 149.

The first side part 142 is located on the −Y direction side with respect to the optical element 130 and extends in the X axis direction along the side surface of the optical element 130. The second side part 144 is located on the +X direction side with respect to the optical element 130 and extends in the Y axis direction along the side surface of the optical element 130. The third side part 146 is located on the +Y direction side with respect to the optical element 130 and extends in the X axis direction along the side surface of the optical element 130. The fourth side part 148 is located on the −X direction side with respect to the optical element 130 and extends in the Y axis direction along the side surface of the optical element 130.

The first side part 142 and the third side part 146 are arranged in parallel to each other. The second side part 144 and the fourth side part 148 are disposed in parallel to each other. The first side part 142, the second side part 144, the third side part 146, and the fourth side part 148 are arranged in the order of the first side part 142, the second side part 144, the third side part 146, and the fourth side part 148 in a circumferential direction S with respect to the optical axis P. The first magnet 182 is disposed on an outer peripheral surface of the first side part 142, the second magnet 184 is disposed on an outer peripheral surface of the third side part 146, and the third magnet 186 is disposed on an outer peripheral surface of the fourth side part 148.

The first connection part 143, the second connection part 145, the third connection part 147, and the fourth connection part 149 connect adjacent side parts among the first side part 142, the second side part 144, the third side part 146, and the fourth side part 148. The first connection part 143 is interposed between the first side part 142 and the second side part 144 to connect the first side part 142 and the second side part 144. The second connection part 145 is interposed between the second side part 144 and the third side part 146 to connect the second side part 144 and the third side part 146. The third connection part 147 is interposed between the third side part 146 and the fourth side part 148 to connect the third side part 146 and the fourth side part 148. The fourth connection part 149 is interposed between the fourth side part 148 and the first side part 142 to connect the fourth side part 148 and the first side part 142. The first connection part 143 and the third connection part 147 are arranged in parallel to each other. The second connection part 145 and the fourth connection part 149 are arranged in parallel to each other.

The contact portion 150 is disposed in each of the first connection part 143, the second connection part 145, the third connection part 147, and the fourth connection part 149. The contact portion 150 includes a first contact portion 152, a second contact portion 154, a third contact portion 156, and a fourth contact portion 158.

The first contact portion 152, the second contact portion 154, the third contact portion 156, and the fourth contact portion 158 are arranged at predetermined intervals along the circumferential direction S. In the present example embodiment, the protrusion 150p of each of the first contact portion 152, the second contact portion 154, the third contact portion 156, and the fourth contact portion 158 is arranged side by side with respect to the optical axis P along the circumferential direction S, and the adjacent protrusions 150p are arranged at intervals of 90° in the circumferential direction S about the optical axis P.

Here, the first contact portion 152 is located on the +X direction side and the −Y direction side with respect to the optical axis P of the optical element 130, and the second contact portion 154 is located on the +X direction side and the +Y direction side with respect to the optical axis P of the optical element 130. The third contact portion 156 is located on the −X direction side and the +Y direction side with respect to the optical axis P of the optical element 130, and the fourth contact portion 158 is located on the −X direction side and the −Y direction side with respect to the optical axis P of the optical element 130. In the present description, the first contact portion 152, the second contact portion 154, the third contact portion 156, and the fourth contact portion 158 may be collectively referred to as contact portion 150.

The elastic body 160 includes a first elastic body 162, a second elastic body 164, a third elastic body 166, and a fourth elastic body 168. The first elastic body 162 presses the first contact portion 152 toward the fixed body 110, and the second elastic body 164 presses the second contact portion 154 toward the fixed body 110. The third elastic body 166 presses the third contact portion 156 toward the fixed body 110, and the fourth elastic body 168 presses the fourth contact portion 158 toward the fixed body 110.

Here, the first elastic body 162 is located on the +X direction side and the −Y direction side with respect to the optical axis P of the optical element 130, the second elastic body 164 is located on the +X direction side and the +Y direction side with respect to the optical axis P of the optical element 130, the third elastic body 166 is located on the −X direction side and the +Y direction side with respect to the optical axis P of the optical element 130, and the fourth elastic body 168 is located on the −x direction side and the −Y direction side with respect to the optical axis P of the optical element 130. In the present description, the first elastic body 162, the second elastic body 164, the third elastic body 166, and the fourth elastic body 168 may be collectively referred to as elastic body 160.

The holder 140 has an inner peripheral surface 140$i$ that holds the optical element 130. The inner peripheral surface 140$i$ is located in the through hole 140$h$. The inner peripheral surface 140$i$ includes a first inner surface 142$i$, a second inner surface 144$i$, a third inner surface 146$i$, a fourth inner surface 148$i$, a first corner 143$i$, a second corner 145$i$, a third corner 147$i$, and a fourth corner 149$i$.

The first inner surface 142$i$, the second inner surface 144$i$, the third inner surface 146$i$, and the fourth inner surface 148$i$ are inside side surfaces of the first side part 142, the second side part 144, the third side part 146, and the fourth side part 148, respectively. The first corner 143$i$, the second corner 145$i$, the third corner 147$i$, and the fourth corner 149$i$ are inside side surfaces of the first connection part 143, the second connection part 145, the third connection part 147, and the fourth connection part 149, respectively. The first corner 143$i$ is located between the first inner surface 142$i$ and the second inner surface 144$i$, and the second corner 145$i$ is located between the second inner surface 144$i$ and the third inner surface 146$i$. The third corner 147$i$ is located between the third inner surface 146$i$ and the fourth inner surface 148$i$, and the fourth corner 149$i$ is located between the fourth inner surface 148$i$ and the first inner surface 142$i$.

The first contact portion 152 is disposed at the first corner 143$i$ of the holder 140, and the second contact portion 154 is disposed at the second corner 145$i$ of the holder 140. The third contact portion 156 is disposed at the third corner 147$i$ of the holder 140, and the fourth contact portion 158 is disposed at the fourth corner 149$i$ of the holder 140. Since the first contact portion 152, the second contact portion 154, the third contact portion 156, and the fourth contact portion 158 are arranged at the first corner 143$i$, the second corner 145$i$, the third corner 147$i$, and the fourth corner 149$i$ of the holder 140, respectively, the movable body 120 can smoothly slide with respect to the fixed body 110.

As described above, although FIG. 4A does not show the optical element 130, as described above with reference to FIG. 3, the optical element 130 is inserted into the through hole 140$h$ of the holder 140. In this case, the elastic body 160 is disposed between the optical element 130 and the contact portion 150, and the elastic body 160 comes into contact with the optical element 130 and the contact portion 150. Therefore, when the optical element 130 is inserted into the holder 140, the elastic body 160 presses the contact portion 150 radially outward. In this manner, since the elastic body 160 presses the contact portion 150 radially outward, the protrusion 150$p$ of the contact portion 150 moves radially outward. Therefore, when the optical element 130 is inserted into the holder 140, a distance L1 between the optical axis P and the protrusion 150$p$ of the contact portion 150 becomes the longest.

As shown in FIG. 4B, the fixed body 110 includes the frame part 111 and the side part 112. The side part 112 includes a first side part 112$a$, a second side part 112$b$, a third side part 112$c$, and a fourth side part 112$d$.

The first side part 112$a$ is located on the −Y direction side with respect to the movable body 120 and extends in the X axis direction. The second side part 112$b$ is located on the +X direction side with respect to the movable body 120 and extends in the Y axis direction. The third side part 112$c$ is located on the +Y direction side with respect to the movable body 120 and extends in the X axis direction. The fourth side part 112$d$ is located on the −X direction side with respect to the movable body 120 and extends in the Y axis direction. The first side part 112$a$, the second side part 112$b$, the third side part 112$c$, and the fourth side part 112$d$ are connected side by side in order of the first side part 112$a$, the second side part 112$b$, the third side part 112$c$, and the fourth side part 112$d$ along the circumferential direction S. In the following description of the present description, a space surrounded by the first side part 112$a$, the second side part 112$b$, the third side part 112$c$, and the fourth side part 112$d$ may be referred to as interior 110S of the fixed body 110.

The frame part 111 is connected from the +Z direction side with respect to the first side part 112$a$, the second side part 112$b$, the third side part 112$c$, and the fourth side part 112$d$. The frame part 111 has the opening 111$h$ that connects the interior 110S of the fixed body 110 and the outside.

The fixed body 110 is provided with the concave 110$q$. The concave 110$q$ is provided on an inner peripheral surface of the fixed body 110. The concave 110$q$ has a shape extending in the circumferential direction S. The concave 110$q$ has a shape in which a center of the concave 110$q$ in the Z axis direction is recessed radially outward. The concave 110$q$ is curved and recessed to have a curved shape. In the present example embodiment, the concave 110$q$ is curved in a spherical shape.

The concave 110$q$ is provided inside a connection section between the first side part 112$a$ and the second side part 112$b$, provided inside a connection section between the second side part 112$b$ and the third side part 112$c$, provided inside a connection section between the third side part 112$c$ and the fourth side part 112$d$, and provided inside a connection section between the fourth side part 112$d$ and the first side part 112$a$.

The plurality of concaves 110$q$ are arranged at predetermined intervals along the circumferential direction S. In the present example embodiment, the four concaves 110q are arranged side by side with respect to the optical axis P along the circumferential direction S, and the adjacent concaves 110q are arranged at intervals of 90° in the circumferential direction S about the optical axis P.

The fixed body 110 has the cutout 110n. The cutout 110n has a shape in which the inner surface of the fixed body 110 is recessed radially outward. In the present example embodiment, the cutout 110n has a shape in which a part of the concave 110q of the fixed body 110 is recessed radially outward. The cutout 110n is continuous to the concave 110q. The cutout 110n needs not be continuous to the concave 110q, and may be disposed at a place spaced apart from the concave 110q in the circumferential direction S.

The cutout 110n is disposed in a part of the fixed body 110 located on the +Z axis direction side. That is, the cutout 110n is disposed in a part of the fixed body 110 located on the lens 132 side of the optical element 130 in the optical axis direction. This facilitates assembly of other components such as the FPC.

Here, a distance L2 between the optical axis P and the radial outside of the cutout 110n is substantially equal to the distance L1 or slightly longer than the distance L1. Due to this, the holder 140 in which the contact portion 150 is disposed can be easily inserted into the fixed body 110.

A distance L3 between the optical axis P and the concave 110q is substantially equal to the distance L1 or slightly shorter than the distance L1. Due to this, when the holder 140 in which the contact portion 150 is disposed is inserted into the fixed body 110, the contact portion 150 presses the elastic body 160 radially inward. Therefore, the elastic body 160 deflects and presses back the contact portion 150 radially outward with an appropriate force toward the fixed body 110.

Typically, the contact portion 150 and the elastic body 160 are attached to the holder 140 shown in FIG. 4A, and then the optical element 130 is inserted. In this case, the elastic body 160 is disposed between the optical element 130 and the contact portion 150, and the elastic body 160 comes into contact with the optical element 130 and the contact portion 150. However, the present example embodiment is not limited to this. At least a part of the elastic body 160 may be disposed between the optical element 130 and the holder 140.

Figure 5A:
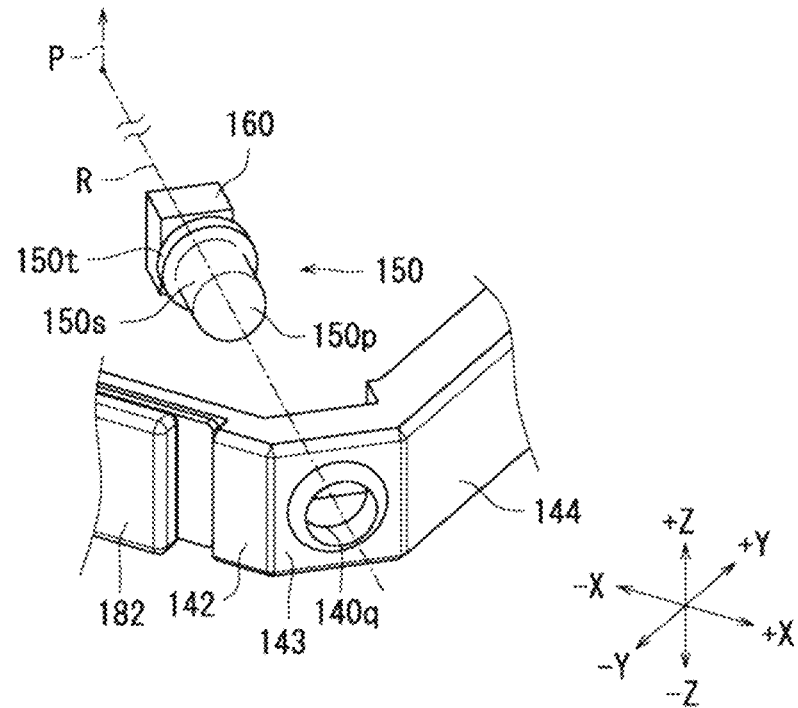
FIG. 5A is a schematic partially enlarged exploded perspective view of the optical assembly of the present example embodiment.
Figure 5B:
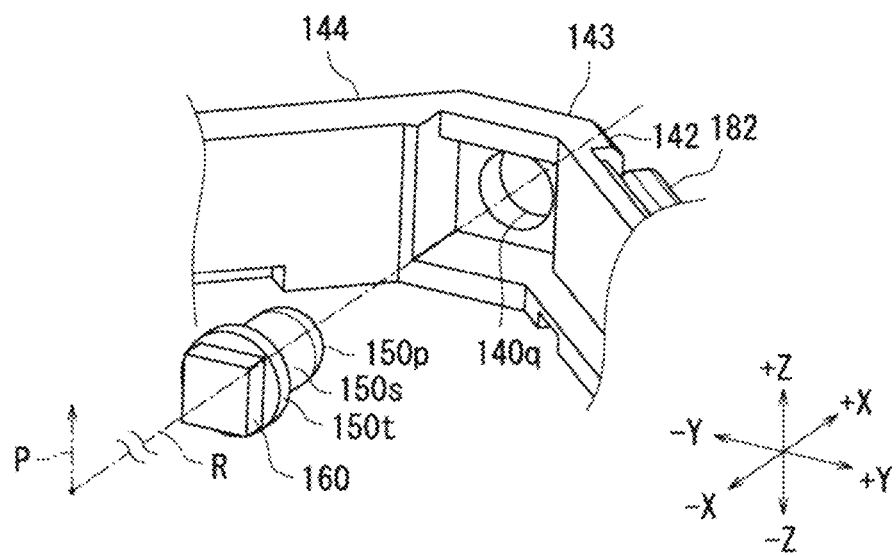
FIG. 5B is a schematic partially enlarged exploded perspective view of the optical assembly of the present example embodiment.

Next, the optical assembly 100 of the present example embodiment will be described with reference to FIGS. 5A and 5B. FIGS. 5A and 5B are schematic exploded perspective views of the holder 140, the contact portion 150, and the elastic body 160 in the movable body 120 of the optical assembly 100 of the present example embodiment. FIGS. 5A and 5B illustrate the first contact portion 152 and the first elastic body 162 mounted on the first connection part 143 of the holder 140 as an example of the contact portion 150 and the elastic body 160.

As shown in FIGS. 5A and 5B, the holder 140 includes a through hole 140q that connects the inside and the outside of the holder 140. The through hole 140q is located at a corner of the holder 140. Specifically, the through hole 140q is provided in each of the first connection part 143, the second connection part 145, the third connection part 147, and the fourth connection part 149 (FIG. 4A) of the holder 140.

In FIGS. 5A and 5B, the first connection part 143 of the holder 140 is provided with the through hole 140q, and the inside and the outside of the holder 140 are connected via the through hole 140q. A diameter (length in the Z axis direction) of at least a part of the contact portion 150 is smaller than a size (length in the Z axis direction) of the through hole 140q. Therefore, the contact portion 150 is inserted into the through hole 140q from the inside of the holder 140, and the contact portion 150 is disposed in the through hole 140q of the holder 140. Specifically, the first contact portion 152, the second contact portion 154, the third contact portion 156, and the fourth contact portion 158 are arranged in the through hole 140q of the holder 140. Thereafter, the elastic body 160 is attached to the holder 140.

Since the contact portion 150 is attached to the holder 140, movement of the contact portion 150 is restricted. Specifically, meanwhile the contact portion 150 is movable in the extending direction of the through hole 140q, the contact portion 150 is restricted from moving by the side surface of the through hole 140q. Therefore, when pressed by the elastic body 160, the contact portion 150 applies a force toward the fixed body 110 from a specific position along the through hole 140q of the holder 140. In this manner, the contact portion 150 presses from a specific position of the holder 140 toward the fixed body 110.

The through hole 140q extends in a radial direction R (direction extending linearly from the optical axis P). Since the contact portion 150 disposed along the radial direction R about the optical axis P of the optical element 130 presses the fixed body 110, it is possible to suppress the deviation of the optical axis P of the optical element 130.

As shown in FIGS. 5A and 5B, the contact portion 150 preferably includes a small-diameter portion 150s and a large-diameter portion 150t. Here, the small-diameter portion 150s and the large-diameter portion 150t each have a columnar shape. A length (for example, the diameter of a circle) of the large-diameter portion 150t along the optical axis P is larger than a length (for example, the diameter of a circle) of the small-diameter portion 150s along the optical axis P. The length of the small-diameter portion 150s along the optical axis P is smaller than the length of the through hole 140q along the optical axis P, and the length of the through hole 140q along the optical axis P is smaller than the length of the large-diameter portion 150t along the optical axis P. The large-diameter portion 150t opposes the elastic body 160. Therefore, the contact portion 150 can be suppressed from coming off from the holder 140. Here, the small-diameter portion 150s and the large-diameter portion 150t each have a columnar shape, but the present example embodiment is not limited to this. The small-diameter portion 150s and the large-diameter portion 150t may each have a quadrangular prism shape. The small-diameter portion 150s of the contact portion 150 is located in the through hole 140q of the holder 140. Therefore, the contact portion 150 can be suppressed from coming off from the holder 140.

FIGS. 5A and 5B illustrate an aspect in which the first contact portion 152 and the first elastic body 162 are attached to the holder 140, and the second contact portion 154, the third contact portion 156, the fourth contact portion 158, the second elastic body 164, the third elastic body 166, and the fourth elastic body 168 are similarly attached to the holder 140.

Figure 6A:
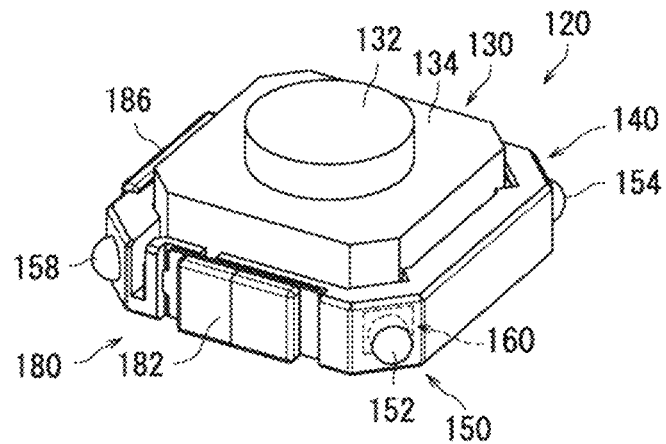
FIG. 6A is a schematic perspective view of a movable body and a magnet in the optical assembly of the present example embodiment.
Figure 6B:
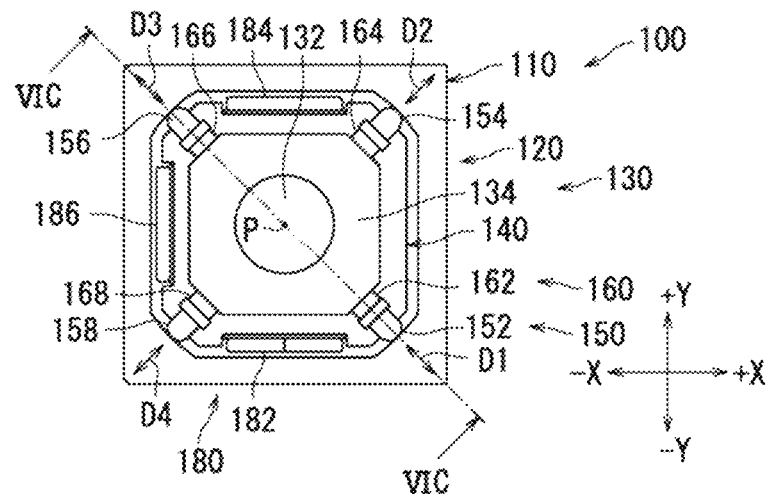
FIG. 6B is a schematic top view of the optical assembly of the present example embodiment.
Figure 6C:
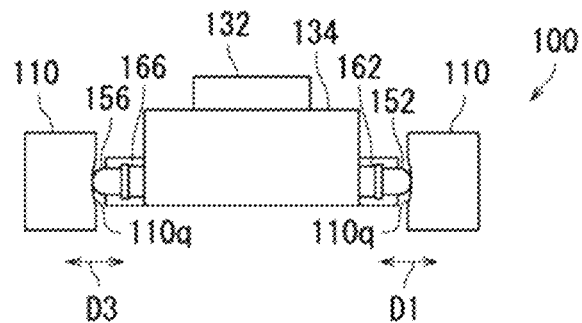
FIG. 6C is a schematic sectional view of the optical assembly taken along line VIC-VIC in FIG. 6B.

Next, the optical assembly 100 of the present example embodiment will be described with reference to FIGS. 6A to 6C. FIG. 6A is a schematic perspective view of the movable body 120 and the magnet 180 in the optical assembly 100 of the present example embodiment, and FIG. 6B is a schematic top view of the optical assembly 100 of the present example embodiment. In FIG. 6B, the lid 100L is omitted. FIG. 6C is a schematic sectional view of the optical assembly 100 taken along line VIC-VIC in FIG. 6B.

As shown in FIG. 6A, the movable body 120 has a thin substantially rectangular parallelepiped shape. The movable body 120 includes the optical element 130, the holder 140, the contact portion 150, and the elastic body 160. The holder 140 has a frame shape, and the optical element 130 is disposed in the holder 140. As shown in FIG. 6B, the elastic body 160 presses the contact portion 150 along a direction orthogonal to the optical axis P of the optical element 130. Since the elastic body 160 presses the contact portion 150 along the direction orthogonal to the optical axis P of the optical element 130, it is possible to suppress the deviation of the optical axis P of the optical element 130.

Specifically, the first elastic body 162 presses the first contact portion 152 along a direction D1. Here, the first elastic body 162 presses the first contact portion 152 along the direction D1 orthogonal to the optical axis P of the optical element 130. Therefore, the first contact portion 152 moves along the direction D1 with respect to the holder 140. The second elastic body 164 presses the second contact portion 154 along a direction D2. Here, the second elastic body 164 presses the second contact portion 154 along the direction D2 orthogonal to the optical axis P of the optical element 130. Therefore, the second contact portion 154 moves along the direction D2 with respect to the holder 140.

Similarly, the third elastic body 166 presses the third contact portion 156 along a direction D3. Here, the third elastic body 166 presses the third contact portion 156 along the direction D3 orthogonal to the optical axis P of the optical element 130. Therefore, the third contact portion 156 moves along the direction D3 with respect to the holder 140. The fourth elastic body 168 presses the fourth contact portion 158 along a direction D4. Here, the fourth elastic body 168 presses the fourth contact portion 158 along the direction D4 orthogonal to the optical axis P of the optical element 130. Therefore, the fourth contact portion 158 moves along the direction D4 with respect to the holder 140.

In the optical assembly 100, a direction in which the first elastic body 162 presses the first contact portion 152, a direction in which the second elastic body 164 presses the second contact portion 154, a direction in which the third elastic body 166 presses the third contact portion 156, and a direction in which the fourth elastic body 168 presses the fourth contact portion 158 intersect one another on the optical axis P of the optical element 130. Since the intersection of the directions in which the forces from the first elastic body 162, the second elastic body 164, the third elastic body 166, and the fourth elastic body 168 are applied intersects on the optical axis P of the optical element 130, it is possible to suppress the deviation of the optical axis P of the optical element 130.

In this manner, since the contact portion 150 disposed in the holder 140 presses the fixed body 110 by the elastic body 160, it is possible to suppress the position of the movable body 120 from being deviated with respect to the fixed body 110. Therefore, even if a gap between the fixed body 110 and the movable body 120 is not strictly adjusted, the movable body 120 can smoothly move in response to the driving force between the magnet 180 and the coil 190.

As shown in FIG. 6C, the movable body 120 presses the fixed body 110 from the radial inside to the radial outside. Specifically, the first elastic body 162 presses the first contact portion 152 toward the fixed body 110 along the direction D1. The third elastic body 166 presses the third contact portion 156 toward the fixed body 110 along the direction D3. FIG. 6C shows the first contact portion 152, the first elastic body 162, the third contact portion 156, and the third elastic body 166, and the same applies to the second contact portion 154, the second elastic body 164, the fourth contact portion 158, and the fourth elastic body 168 shown in FIG. 6B. In this manner, since the elastic body 160 presses the contact portion 150 toward the fixed body 110 along the radial direction, it is possible to suppress the position of the movable body 120 from being deviated with respect to the fixed body 110. Furthermore, since the force applied to the fixed body 110 from the movable body 120 side is weak, the movable body 120 can be smoothly moved with respect to the fixed body 110.

When the ambient temperature of the optical assembly changes, the gap between the movable body and the fixed body may fluctuate due to the difference in the thermal expansion coefficient of each member. However, in the optical assembly 100 of the present example embodiment, even if the ambient temperature of the optical assembly 100 changes, the elastic body 160 presses the contact portion 150 toward the fixed body 110, and therefore it is possible to suppress the position of the movable body 120 from being deviated with respect to the fixed body 110.

In the above description with reference to FIGS. 2 to 6C, the contact portion 150 includes the protrusion 150p, the fixed body 110 includes the concave 110q corresponding to the protrusion 150p, and the protrusion 150p on the movable body 120 side slides with respect to the concave 110q on the fixed body 110 side, but the present example embodiment is not limited to this. The contact portion 150 may include a concave, the fixed body 110 may include a protrusion corresponding to the concave of the contact portion 150, and the protrusion on the fixed body 110 side may slide with respect to the concave on the movable body 120 side.

Figure 7A:
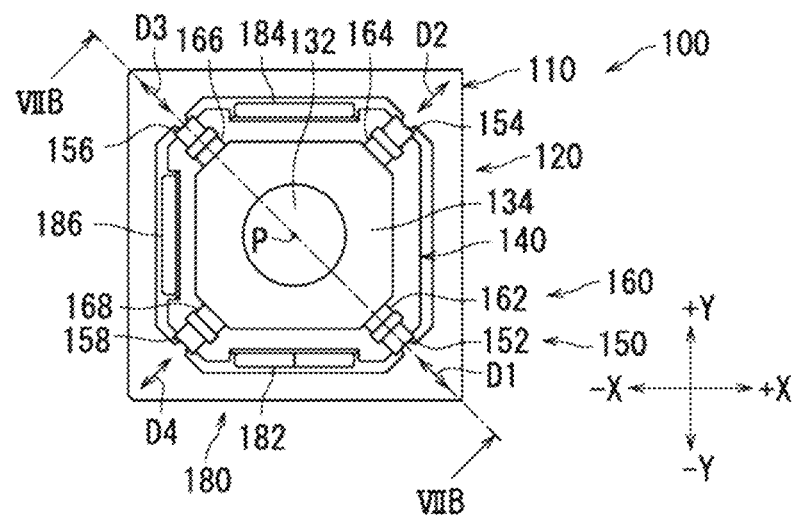
FIG. 7A is a schematic top view of the optical assembly of the present example embodiment.
Figure 7B:
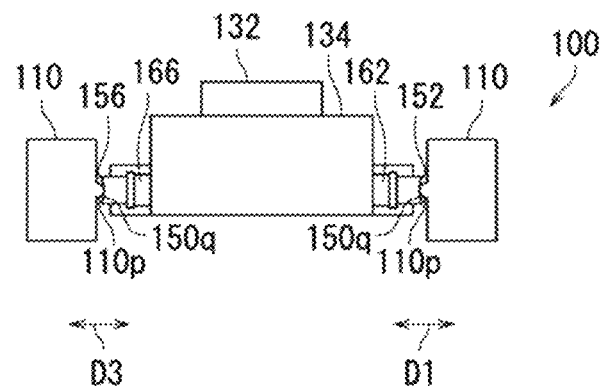
FIG. 7B is a schematic sectional view of the optical assembly taken along line VIIB-VIIB in FIG. 7A.

Next, the optical assembly 100 of the present example embodiment will be described with reference to FIGS. 7A and 7B. FIG. 7A is a schematic top view of the optical assembly 100 of the present example embodiment, and FIG. 7B is a schematic sectional view of the optical assembly. FIGS. 7A and 7B have the same configuration as that of the optical assembly 100 described with reference to FIGS. 6B and 6C except that the contact portion 150 includes a concave 150q on the radial outside and the fixed body 110 includes a protrusion 110p, and overlapping description will be omitted to avoid redundancy.

As shown in FIGS. 7A and 7B, the protrusion 110p is disposed on a surface of the fixed body 110 opposing the movable body 120. The protrusion 110p preferably has a hemispherical shape.

The movable body 120 of the optical assembly 100 includes the optical element 130, the holder 140, the contact portion 150, and the elastic body 160. Here, the contact portion 150 includes the concave 150q on the radial outside. Also here, the elastic body 160 presses the contact portion 150 toward the fixed body 110.

In this case, the protrusion 110p of the fixed body 110 slides on the concave 150q while being in contact with the concave 150q on the movable body 120 side. The protrusion 110p is located on the inner peripheral surface of the fixed body 110. The protrusion 110p protrudes radially inward toward the holder 140 and comes into contact with the contact portion 150. The protrusion 110p may have a curved shape protruding in a curved manner. For example, the protrusion 110p is curved in a spherical shape. The concave 150q preferably has a part of a concave spherical shape.

In the above description with reference to FIGS. 2 to 7B, the contact portion 150 disposed in the first connection part 143, the second connection part 145, the third connection part 147, and the fourth connection part 149 of the holder 140 is pressed toward the fixed body 110 by the elastic body 160, but the present example embodiment is not limited to this. While a part of the contact portion 150 is pressed against the fixed body 110 by the elastic body, the other part of the contact portion 150 needs not be pressed against the fixed body 110.

Figure 8A:
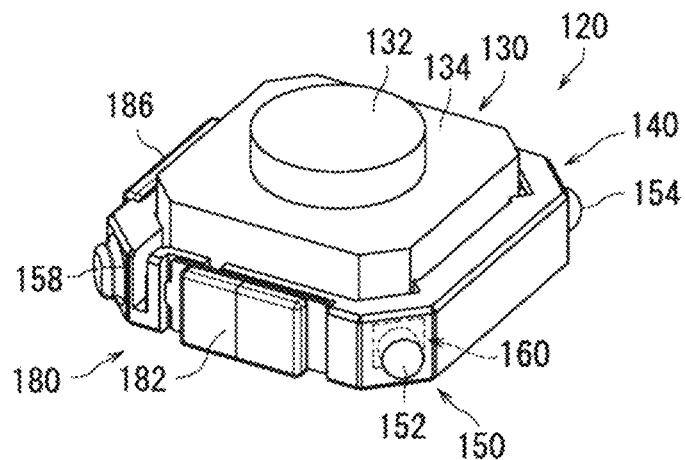
FIG. 8A is a schematic perspective view of a movable body and a magnet in the optical assembly of the present example embodiment.
Figure 8B:
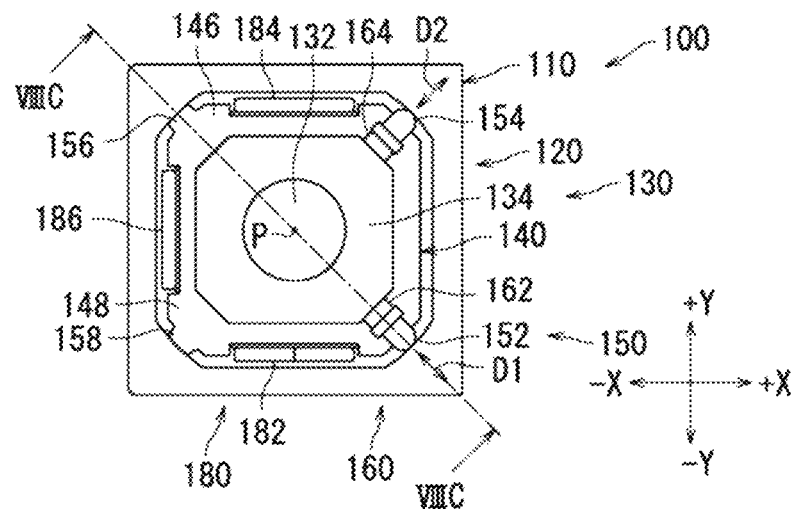
FIG. 8B is a schematic top view of the optical assembly of the present example embodiment.
Figure 8C:
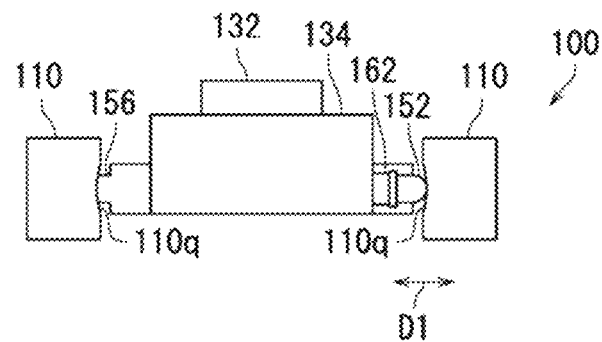
FIG. 8C is a schematic sectional view of the optical assembly taken along line VIIIC-VIIIC in FIG. 8B.

Next, the optical assembly 100 of the present example embodiment will be described with reference to FIGS. 8A to 8C. FIG. 8A is a schematic perspective view of the movable body 120 and the magnet 180 in the optical assembly 100 of the present example embodiment, FIG. 8B is a schematic top view of the optical assembly 100 of the present example embodiment, and FIG. 8C is a schematic sectional view of the optical assembly 100 taken along line VIIIC-VIIIC in FIG. 8B. FIGS. 8A to 8C have the same configuration as that of the optical assembly 100 described with reference to FIGS. 6A to 6C except that the third contact portion 156 and the fourth contact portion 158 are a single member with the holder 140, and the third elastic body 166 and the fourth elastic body 168 corresponding to the third contact portion 156 and the fourth contact portion 158 are not arranged, and overlapping description will be omitted to avoid redundancy.

As shown in FIG. 8A, the movable body 120 includes the optical element 130, the holder 140, the contact portion 150, and the elastic body 160. The contact portion 150 includes the first contact portion 152, the second contact portion 154, the third contact portion 156, and the fourth contact portion 158. The first contact portion 152, the second contact portion 154, the third contact portion 156, and the fourth contact portion 158 each have the protrusion 150p. However, here, the first contact portion 152 and the second contact portion 154 are separate members from the holder 140, whereas the third contact portion 156 and the fourth contact portion 158 are a single member with the holder 140.

As shown in FIG. 8B, the elastic body 160 includes the first elastic body 162 and the second elastic body 164. The first elastic body 162 presses the first contact portion 152 toward the fixed body 110. The second elastic body 164 presses the second contact portion 154 toward the fixed body 110. Therefore, the first contact portion 152 is movable along the direction D1, and the second contact portion 154 is movable along the direction D2. Here, the direction D1 is parallel to the radial direction, and the direction D2 is also parallel to the radial direction. However, the third contact portion 156 and the fourth contact portion 158 are fixed to the holder 140, and third contact portion 156 and the fourth contact portion 158 do not move with respect to the holder 140.

In the present example embodiment, the elastic body 160 presses the contact portion 150 toward the fixed body 110 at two adjacent connection parts (the first connection part 143 and the second connection part 145) of the first connection part 143, the second connection part 145, the third connection part 147, and the fourth connection part 149 of the holder 140. Therefore, the movable body 120 can be stably supported with respect to the fixed body 110 with a small force.

Furthermore, the direction in which the first elastic body 162 presses the first contact portion 152 and the direction in which the second elastic body 164 presses the second contact portion 154 intersect each other on the optical axis P of the optical element 130. An intersection of the directions in which the forces from the first elastic body 162 and the second elastic body 164 are applied intersects on the optical axis P of the optical element 130. Therefore, it is possible to suppress the deviation of the optical axis P of the optical element 130.

As shown in FIG. 8C, the movable body 120 presses the fixed body 110 from the radial inside to the radial outside. Specifically, the first elastic body 162 presses the first contact portion 152 toward the fixed body 110. Here, however, the third contact portion 156 remains fixed to the holder 140. While FIG. 8C shows the first contact portion 152, the first elastic body 162, and the third contact portion 156, the same applies to the second contact portion 154, the second elastic body 164, and the fourth contact portion 158 shown in FIG. 6A. In this manner, since the elastic body 160 presses the contact portion 150 toward the fixed body 110, it is possible to suppress the position of the movable body 120 from being deviated with respect to the fixed body 110. Furthermore, since the force applied to the fixed body 110 from the movable body 120 side is weak, the movable body 120 can be smoothly moved with respect to the fixed body 110.

In the optical assembly 100 of the present example embodiment, two contact portions (the first contact portion 152 and the second contact portion 154) of the first contact portion 152, the second contact portion 154, the third contact portion 156, and the fourth contact portion 158 of the movable body 120 are pressed by the elastic body 160, whilst the other two contact portions (the third contact portion 156 and the fourth contact portion 158) are not pressed by the elastic body 160. Therefore, the resistance of the movable body 120 with respect to the fixed body 110 can be reduced, and the driving power for driving the movable body 120 can be reduced.

FIGS. 3 to 8C show the elastic body 160 in a rectangular shape, but the elastic body 160 is not limited to a rectangular shape. At least a part of the elastic body 160 may be located between the optical element 130 and the holder 140.

Figure 9A:
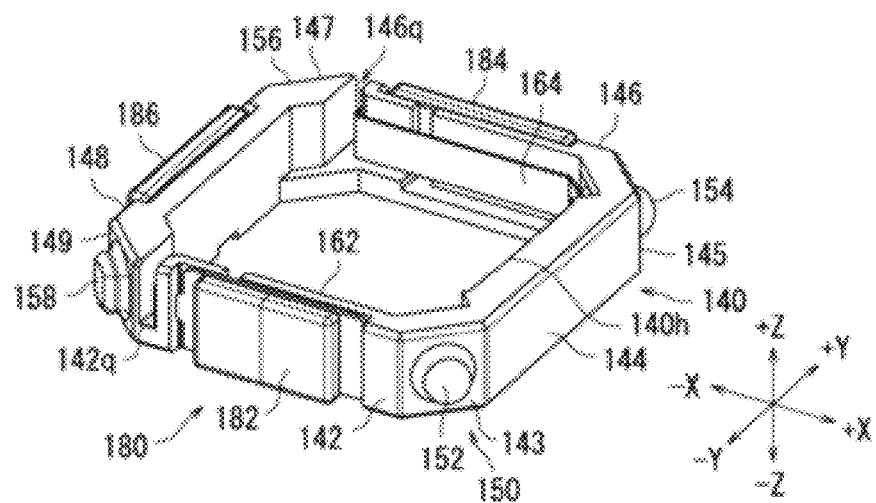
FIG. 9A is a schematic perspective view of the holder, the contact portion, the elastic body, and the magnet in the optical assembly of the present example embodiment.
Figure 9B:
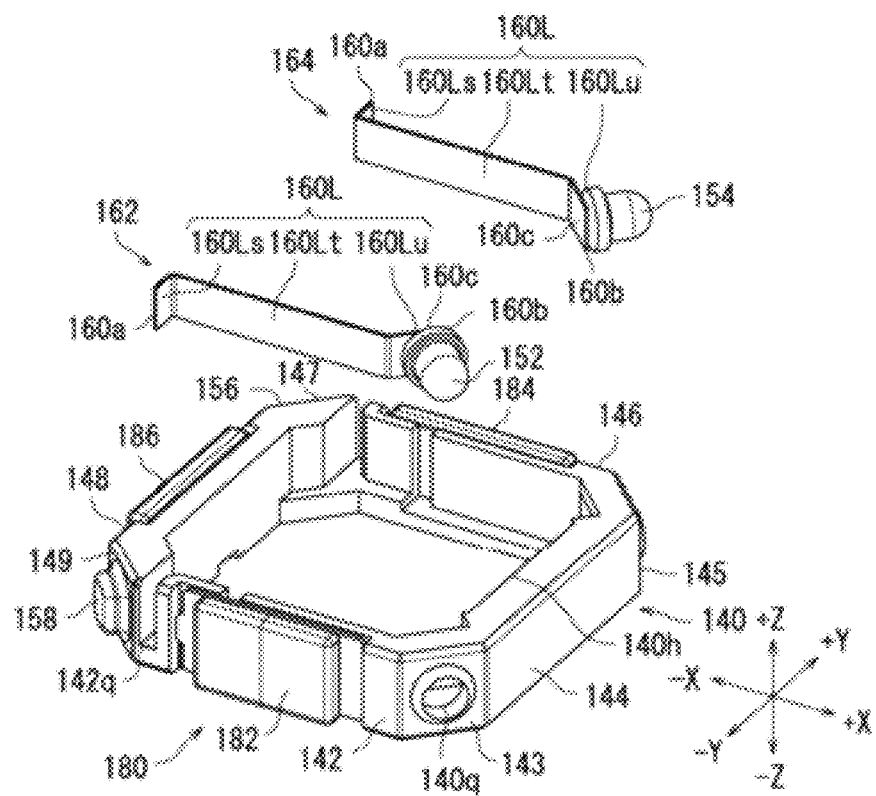
FIG. 9B is an exploded perspective view of FIG. 9A.

Next, the optical assembly 100 of the present example embodiment will be described with reference to FIGS. 9A and 9B. FIG. 9A is a schematic perspective view of the holder 140, the contact portion 150, the elastic body 160, and the magnet 180 in the optical assembly 100 of the present example embodiment, and FIG. 9B is an exploded perspective view of FIG. 9A. Here, the optical element 130 attached to the holder 140 is omitted.

As shown in FIGS. 9A and 9B, the contact portion 150 includes the first contact portion 152, the second contact portion 154, the third contact portion 156, and the fourth contact portion 158. Here, the first contact portion 152 and the second contact portion 154 are separate members from the holder 140, and the third contact portion 156 and the fourth contact portion 158 are coupled to the holder 140.

The elastic body 160 includes the first elastic body 162 and the second elastic body 164. Here, the first elastic body 162 presses the first contact portion 152, and the second elastic body 164 presses the second contact portion 154.

Although not illustrated in FIGS. 9A and 9B, the optical element 130 is inserted into the through hole 140h of the holder 140. At least a part of the elastic body 160 is located between the optical element 130 and the holder 140. Since the elastic body 160 is located between the optical element 130 and the holder 140, the elastic body 160 presses the contact portion 150 from the movable body side toward the fixed body 110 side.

For example, the first elastic body 162 and the second elastic body 164 each include a leaf spring 160L. Therefore, an elastic force can be applied to the contact portion 150 in a space-saving manner.

At least a part of the leaf spring 160L extends perpendicularly to the optical axis P. Therefore, the force applied from the leaf spring 160L can be reduced.

The leaf spring 160L includes a first end 160a and a second end 160b. The first end 160a of the leaf spring 160L is fixed to the holder 140. Specifically, the holder 140 is provided with recesses 142q and 146q for fixing the leaf spring 160L, and the first end 160a of the leaf spring 160L is inserted into the recesses 142q and 146q of the holder 140. On the other hand, the second end 160b of the leaf spring 160L is not fixed to the holder 140. A distance between a contact position 160c of the leaf spring 160L in contact with the contact portion 150 and the first end 160a is longer than a distance between the contact position 160c of the leaf spring 160L and the second end 160b. Therefore, with a simple configuration, the load with which the contact portion 150 presses the fixed body 110 can be reduced, and the movable body 120 can be smoothly moved with respect to the fixed body 110.

The leaf spring 160L includes a fixed portion 160Ls, a linear portion 160Lt, and a curved portion 160Lu. The fixed portion 160Ls includes the first end 160a and is fixed to the holder 140. The linear portion 160Lt is bent with respect to the fixed portion 160Ls and extends linearly. The curved portion 160Lu includes the second end 160b and is curved with respect to the linear portion 160Lt. The curved portion 160Lu of the leaf spring 160L presses the contact portion 150. In this manner, since the curved portion 160Lu of the leaf spring 160L presses the contact portion 150, a force in a specific direction can be applied to the contact portion 150 in a space-saving manner.

At least a part of the leaf spring 160L extends perpendicularly to the optical axis P. For example, each of the fixed portion 160Ls, the linear portion 160Lt, and the curved portion 160Lu of the leaf spring 160L extends in a direction orthogonal to the optical axis P. Due to this, the leaf spring 160L that radially presses the contact portion 150 can be disposed in a space-saving manner.

Figure 10A:
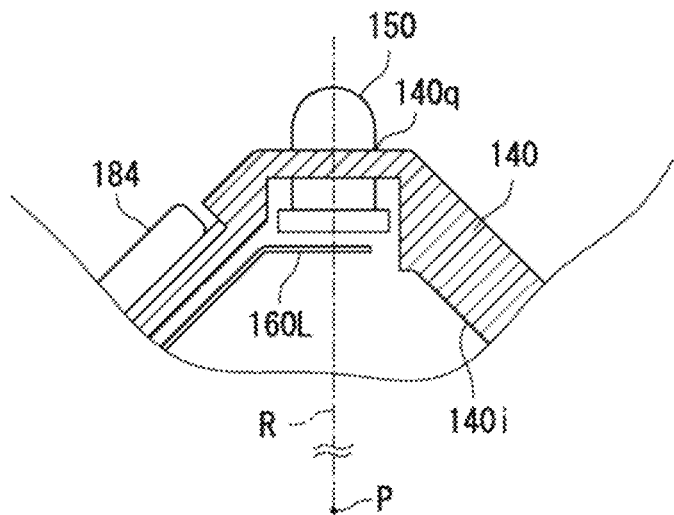
FIG. 10A is a schematic partially enlarged sectional view of the optical assembly of the present example embodiment.
Figure 10B:
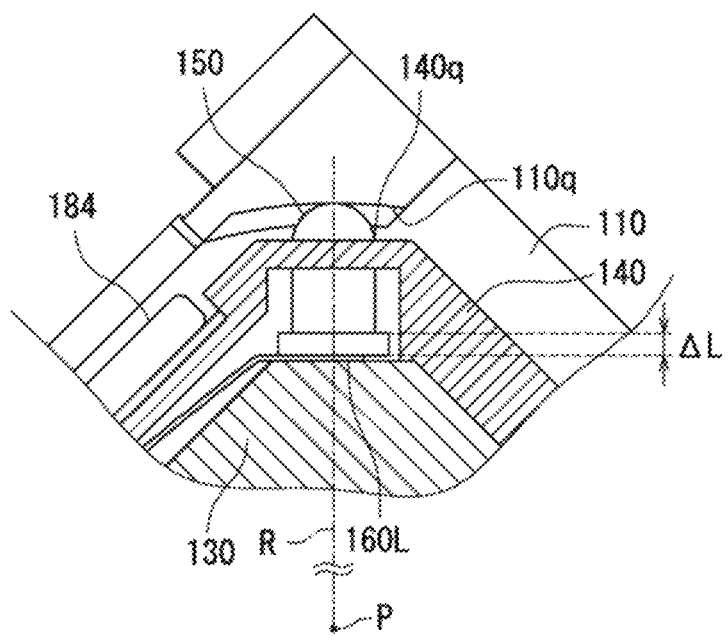
FIG. 10B is a schematic partially enlarged sectional view of the optical assembly of the present example embodiment.

Next, the optical assembly 100 of the present example embodiment will be described with reference to FIGS. 9A to 10B. FIGS. 10A and 10B are schematic partially enlarged views in which vicinities of the holder 140, the contact portion 150, and the elastic body 160 in the optical assembly 100 of the present example embodiment are enlarged. FIGS. 10A and 10B show the second contact portion 154 and the second elastic body 164 attached to the second connection part 145 of the holder 140 as an example of the contact portion 150 and the elastic body 160. In FIG. 10A, the optical element 130 is removed from the movable body 120 in the optical assembly 100, and in FIG. 10B, the movable body 120 in the optical assembly 100 is inserted into the fixed body 110.

As shown in FIGS. 10A and 10B, the elastic body 160 includes the leaf spring 160L. As described above with reference to FIG. 9, the leaf spring 160L includes the fixed portion 160Ls, the linear portion 160Lt, and the curved portion 160Lu. When the optical element 130 is removed from the movable body 120 in the optical assembly 100, the linear portion 160Lt is separated from the inner peripheral surface 140i of the holder 140, and as a result, a slight gap is formed between the curved portion 160Lu of the leaf spring 160L and the contact portion 150.

As shown in FIG. 10A, the curved portion 160Lu of the leaf spring 160L and the contact portion 150 are arrayed along the radial direction R from the optical axis P toward the through hole 140q of the holder 140.

As shown in FIG. 10B, when the movable body 120 is inserted into the fixed body 110, the contact portion 150 comes into contact with the fixed body 110 and is pressed radially inward, and therefore the contact portion 150 moves radially inward and the leaf spring 160L deflects. The leaf spring 160L can deflect until the curved portion 160Lu of the leaf spring 160L comes into contact with the optical element 130.

At this time, the optical element 130, the curved portion 160Lu of the leaf spring 160L, and the contact portion 150 are arrayed along the radial direction from the optical axis P toward the through hole 140q of the holder 140. When the fixed body 110 and the optical element 130 are attached to the holder 140 in which the contact portion 150 and the leaf spring 160L are arranged, the leaf spring 160L deflects by ΔL. Therefore, the elastic body 160 presses the contact portion 150 toward the fixed body 110 by the elastic force generated in accordance with the deflection amount (ΔL) of the leaf spring 160L.

Figure 11:
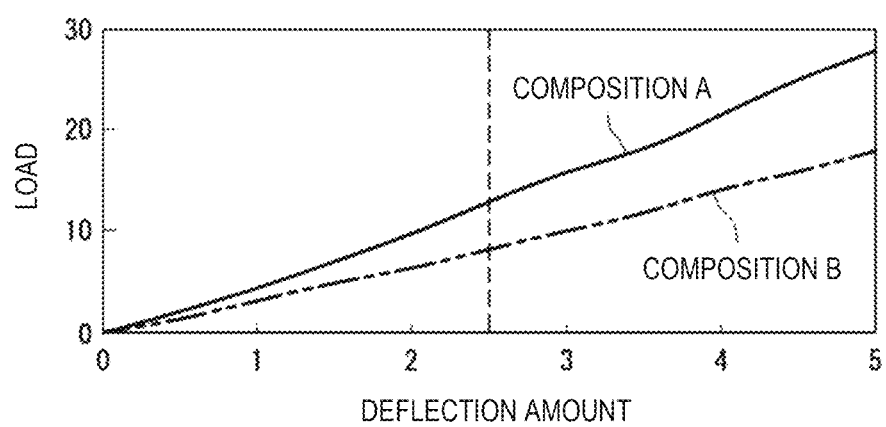
FIG. 11 is a graph showing a change in load in accordance with a composition of an elastic body according to an example embodiment of the present invention.

Next, the optical assembly 100 of the present example embodiment will be described with reference to FIG. 11. FIG. 11 is a graph showing a change in load in accordance with the composition of the elastic body 160. In the graph of FIG. 11, the horizontal axis represents the deflection amount and the vertical axis represents the load. The units of the horizontal axis and the vertical axis are discretionary.

In FIG. 11, a result in a case where the elastic body includes a composition A is indicated by a line A, and a result in a case where the elastic body includes a composition B is indicated by a line B. The elastic body of the composition A has the same deflection amount and a larger load as compared with those of the elastic body of the composition B. The composition of the elastic body 160 can be determined based on the force (load) required for the movable body 120 to press the fixed body 110 and a designable deflection amount of the elastic body 160. For example, in order to weaken the pressing force of the movable body 120 with respect to the fixed body 110, the elastic body 160 preferably includes the composition B rather than the composition A.

In the above description with reference to FIGS. 3 to 10B, the contact portion 150 has a columnar part, but the present example embodiment is not limited to this. The contact portion 150 may include a spherical member. In this case, the contact portion 150 may be fixed to the elastic body 160.

Note that while FIG. 1 shows the smartphone 200 as an example of the application of the optical assembly 100 of the present example embodiment, the application of the optical assembly 100 is not limited to this. The optical assembly 100 is preferably used for a digital camera or a video camera. For example, the optical assembly 100 may be used as a part of a dashboard camera. Alternatively, the optical assembly 100 may be mounted on a camera for a flight vehicle (for example, a drone).

The example embodiment of the present disclosure has been described above with reference to the drawings. However, the present disclosure is not limited to the above example embodiment, and can be implemented in various modes without departing from the gist of the disclosure. Various disclosure are possible by appropriately combining the plurality of constituent elements disclosed in the above example embodiment. For example, some constituent elements may be removed from among all the constituent elements described in the example embodiment. Furthermore, constituent elements over different example embodiments may be combined as appropriate. To facilitate better understanding, the drawings schematically t elements as main subjects, and the thickness, length, number, interval, and the like of each constituent element illustrated may be different from reality for the convenience of creating the drawings. Additionally, the material, shape, dimension, and the like of each constituent element shown in the above example embodiment are mere examples and are not particularly limited, and various modifications can be made without substantially departing from the effects of the present disclosure.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. An optical assembly comprising:
a fixed body; and
a movable body supported swingably with respect to the fixed body; wherein
the movable body includes:
an optical element including an optical axis;
a holder into which the optical element is insertable;
a contact portion located in the holder and contactable with the fixed body; and
an elastic body to press the contact portion toward the fixed body; and
the elastic body is located between the holder and the optical element.

2. The optical assembly according to claim 1, wherein the elastic body presses the contact portion along a direction orthogonal to the optical axis of the optical element.

3. The optical assembly according to claim 1, wherein the elastic body includes a leaf spring.

4. The optical assembly according to claim 3, wherein at least a portion of the leaf spring extends in a perpendicular direction with respect to the optical axis.

5. The optical assembly according to claim 3, wherein
the leaf spring includes a first end fixed to the holder and a second end not fixed to the holder; and
a distance between a contact position of the leaf spring in contact with the contact portion and the first end is greater than a distance between the contact position of the leaf spring and the second end.

6. The optical assembly according to claim 5, wherein
the leaf spring includes a fixed portion including the first end, a linear portion bent with respect to the fixed portion, and a curved portion including the second end and curved with respect to the linear portion; and
the curved portion of the leaf spring presses the contact portion.

7. The optical assembly according to claim 1, wherein
the holder includes a through hole connecting an inside and an outside of the holder;
the contact portion is disposed in the through hole; and
the through hole extends linearly from the optical axis.

8. The optical assembly according to claim 7, wherein
the contact portion includes a small-diameter portion and a large-diameter portion, which has a diameter larger than a diameter of the small-diameter portion; and
the large-diameter portion opposes the elastic body.

9. The optical assembly according to claim 8, wherein the small-diameter portion of the contact portion is located in the through hole of the holder.

10. The optical assembly according to claim 1, wherein the contact portion slides with respect to the fixed body.

11. The optical assembly according to claim 1, wherein the contact portion includes a protrusion protruding to the fixed body.

12. The optical assembly according to claim 11, wherein the protrusion includes a portion of a spherical surface.

13. The optical assembly according to claim 11, wherein the fixed body includes a concave surface in a region in contact with the protrusion.

14. The optical assembly according to claim 13, wherein the concave surface has a concave spherical shape.

15. The optical assembly according to claim 13, wherein the fixed body includes a cutout continuous to the concave surface.

16. The optical assembly according to claim 1, wherein
the holder includes an inner peripheral surface provided with a through hole to hold the optical element;
the inner peripheral surface includes:
a first inner surface;
a second inner surface;
a third inner surface;
a fourth inner surface;
a first corner located between the first inner surface and the second inner surface;
a second corner located between the second inner surface and the third inner surface;
a third corner located between the third inner surface and the fourth inner surface; and
a fourth corner located between the fourth inner surface and the first inner surface; and
the contact portion includes:
a first contact portion located at the first corner of the holder;
a second contact portion located at the second corner of the holder;
a third contact portion located at the third corner of the holder; and
a fourth contact portion located at the fourth corner of the holder.

17. The optical assembly according to claim 16, wherein
the elastic body includes:
a first elastic body that presses the first contact portion toward the fixed body; and
a second elastic body that presses the second contact portion toward the fixed body.

18. The optical assembly according to claim 17, wherein a direction in which the first elastic body presses the first contact portion and a direction in which the second elastic body presses the second contact portion intersect on the optical axis of the optical element.

* * * * *